(No Model.) 2 Sheets—Sheet 1.

E. A. SPERRY.
POWER GEARING FOR VEHICLES.

No. 434,097. Patented Aug. 12, 1890.

Witnesses:
S. B. Dover:
Celeste P. Chapman.

Inventor:
Elmer A. Sperry.

(No Model.) 2 Sheets—Sheet 2.
E. A. SPERRY.
POWER GEARING FOR VEHICLES.
No. 434,097. Patented Aug. 12, 1890.
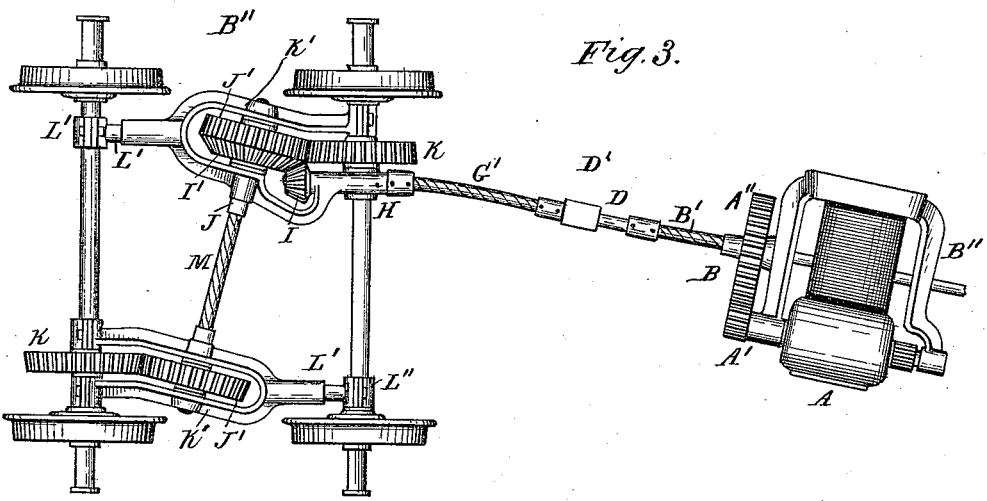
Fig. 3.
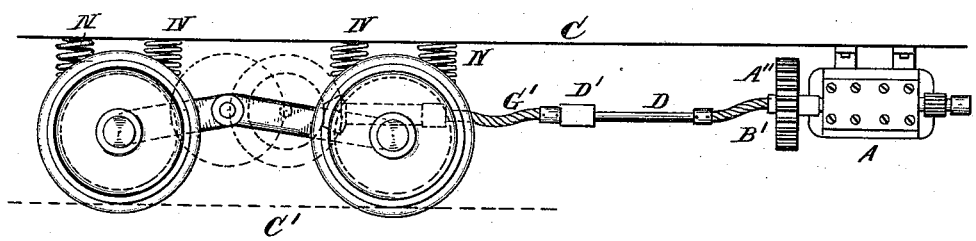
Fig. 4.
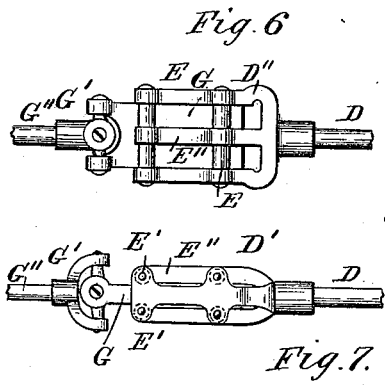
Fig. 6.
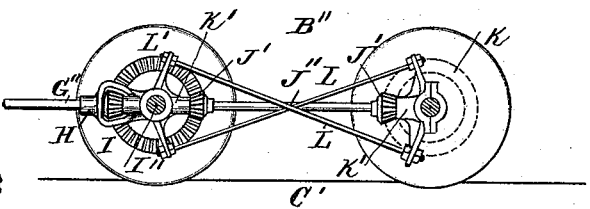
Fig. 5.
Fig. 7.
Witnesses:
S. B. Dover.
Leslie P. Chapman.
Inventor:
Elmer A. Sperry.

UNITED STATES PATENT OFFICE.

ELMER A. SPERRY, OF CHICAGO, ILLINOIS.

POWER-GEARING FOR VEHICLES.

SPECIFICATION forming part of Letters Patent No. 434,097, dated August 12, 1890.

Application filed March 17, 1890. Serial No. 344,219. (No model.)

*To all whom it may concern:*

Be it known that I, ELMER A. SPERRY, a citizen of the United States, residing at Chicago, in the county of Cook and State of Illinois, have invented a certain new and useful Improvement in Systems of Power Distribution for Vehicles, of which the following is a clear and exact specification.

My invention relates to a system of distributing power to cars; and it consists in various details whereby the various wheels are allowed to be independent in their movements as they pass over the track, and at the same time receive the energy from a central source or sources of power, together with other features, fully described in the specification.

My invention is illustrated in the accompanying drawings, wherein—

Figure 1:
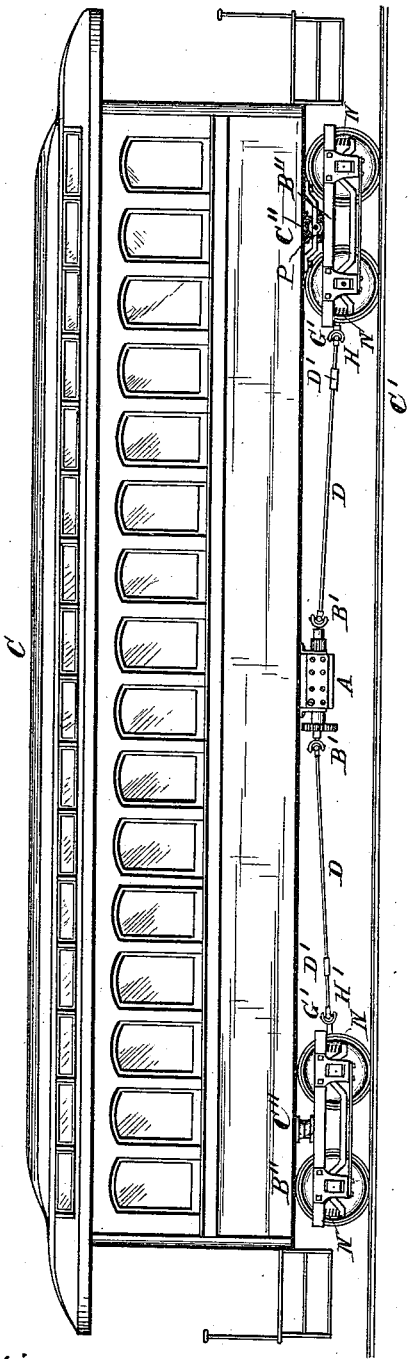
Figure 2:
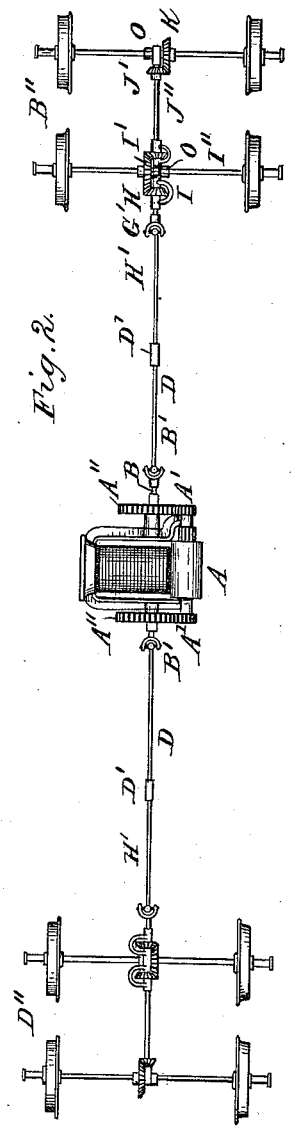

Figure 1 represents a side elevation of a car fitted with my improvements. Fig. 2 represents a plan view of same. Figs. 3 and 4 represent alternate forms. Figs. 5, 6, and 7 represent details.

Like letters of reference indicate like parts throughout the several views.

A indicates a motor, A' A' pinions driven by said motor, and A'' A'' gears meshing with such pinions, B indicating the shafting upon which the gears are mounted. Connecting with this shaft is a universal joint B', extending toward the trucks B'' B''. These trucks support the car C in the usual manner and rest upon the track C', and in making curves turn about the central bolster-gudgeons C'' C''. In this emergency the power-connection between the truck and the motor is retained by the universal joint or its equivalent flexible shaft, and by the shaft D, at the extremity of which is a slip-joint, indicated by D'. One construction of this slip-joint is shown in Figs. 6 and 7, wherein D'' is a frame connected with the shaft D, carrying, say, eight rollers E, which revolve upon pins E', and are separated by a central web E''. The rollers are separated by a space which is filled by the plate G, which in this case forms a portion of the universal joint G', fastened to the shaft G''. The plate in drawing in and out is supported at its edges by the frame D'', which is fitted thereto. In Figs. 3 and 4 this universal joint is replaced by its equivalent, the flexible shaft G', and the shaft G'' is incased almost entirely within the journal H. In Figs. 1 and 2 a short piece of shafting H' is used to connect the slip-joint D' to the universal joint G'. The journal H supports the pinion I, which serves to drive the gear I'. In Figs. 1, 2, and 5 this gear is mounted upon one of the axles I'' of the truck, and in Figs. 3 and 4 it is mounted upon an intermediate shaft J. Power is thence distributed to the other axle by means of pinions J' J', meshing with the gears upon the axles indicated by the letter K. The pinions are journaled in the housings K', which are free to revolve about and are supported upon the axles, as seen in Figs. 2, 3, 4, and 5. These housings connect the two axles, those in Fig. 5 by rods L, those in Fig. 3 by a slip-joint L' and journal-box L'', the idea being to admit of a perfectly-independent movement between the elements of each truck—that is, if one end of the axle is upon a rise in the track and the other end in a depression, the other axle may be in the same relation, or may be in opposite relation, and still the pitch-lines of all the gears will be held intact and in a normal operative condition.

In Fig. 3 the cross-shaft connecting the elements of the truck is divided and as universal joint or piece of flexible shafting M inserted, which connects the elements so far as rotative effort is concerned and allows of independence of movement. The height of this shaft will be seen in Fig. 4 to be such that the pinion-shaft contained in journal H may come above the car-axle, and therefore not interfere with the perfectly-free movement of the latter. It will be understood that the trucks, in swinging about their bolster-gudgeons C'', will require different lengths of connection between the pinion I and the gear A''. This is provided by the slip-joint D'. The car-axles are allowed free and independent movement by means of the springs N. (Shown in Figs. 1 and 5.)

The trucks are preferably so constructed that very little end-play is given to the axles, and collars O are provided for keeping the pinions in proper lateral relations with reference to the gears and may be adjusted for wear.

P indicates two lateral supports for the car upon the truck.

The use and operation of the system may be briefly stated as follows: The power coming from any suitable motor, as A, is distributed in both directions to the trucks, the plan being to distribute the effort to all the points upon which an eight-wheel car bears. Of course my system would apply equally well to a twelve-wheel car, or a car with any other number of wheels in which the wheels are grouped in trucks and the trucks arranged to turn about a gudgeon through which mainly the car is supported. The rods L L, which connect the elements of the truck, are made small and flexible, so as to admit of a certain amount of independence of movement in a perpendicular plane of the axles. The lateral supports P are introduced to resist the effort of torque between the car and trucks, this reaction being necessary and equal to the direct effort given by the motor A to the trucks through the longitudinal shaft. The power arriving at the trucks through the slip-joints and universal joints or flexible shafting B' D' and G', it is applied by gearing in the usual manner. The mounting and disposition of the gearing has been fully described. It will be readily seen that all gearing is held always rigidly upon the pitch-line, irrespective of the perpendicular alignment of the axles of the truck. In case of Figs. 2 and 5 the differences in horizontal alignment will take place about the center of the shaft J'', which will merely tend to rotate one of the axles with reference to the other slightly. In Figs. 3 and 4 the flexible shaft N accommodates the difference in alignment, and at the same time the pitch-lines of the gears and pinions are held intact on each side independently. It is supposed that the journals of the truck are placed at a uniform distance on each side and that all the wheels used under each car are of the same size, or are of such a size that the gearing will cause their peripheries to rotate at equal velocities.

It will be understood that by using the flexible shafts there is a cushion or lost motion in the torque, no matter in which direction the rotation takes place. This lost motion, slip, or spring action is thought to have merits peculiar to itself—as, for instance, where the wheels are not exactly the same size.

I do not care to limit myself to the exact details shown, as many other details could be made to operate in exactly the same manner and perform the functions described above.

I do not wish to limit myself to an electric motor as shown in the drawings, or even to a single motor, as it will be readily understood that the shaft B'' could be in two parts, each driven from the same motor, as shown in Fig. 2, or separate motors could be employed to drive each, which in some cases would have an advantage. In any case, however, these motors could be mounted so as to have the benefit of the springs of the trucks for best effects.

What I claim as new, and desire to secure by Letters Patent, is—

1. A car mounted upon pivotal trucks, the elements of which have independent perpendicular motions, connections between the said trucks, and a driving motor or motors, by means of which all the elements of all the trucks rotate in unison.

2. In a car, a truck the individual parts of which are free to move independently a short distance in a perpendicular direction, and connecting mechanism which compels the motion of each element to be about the center of the axle of the other element.

3. A truck for a vehicle, the elements of which are capable of comparatively small independent motion in a perpendicular direction, and coupled so as as at the same time to sustain an equal rotative connection, one element with the other.

4. A truck for a vehicle, the elements of which are capable of comparatively small independent motion in a perpendicular direction, in combination with connecting mechanism, whereby the peripheries of all the wheels of said truck are driven at a constant velocity, at the same time allowing of independence of motion of each element about the other as a center.

5. In a truck, a frame which keeps the axles practically parallel in one plane, allowing of independence of motion in the other plane, and connecting mechanism for distributing power to each axle, and at the same time admit of the perpendicular motions to take place in such a manner that in each element it will swing about the other element as a center.

6. In a truck, the combination, with the axles, of gearing connecting the axles, the gearing being so organized as to allow the axles free movement with reference to each other in one plane while unimpaired driving-connection is sustained, the gearing being so organized that the movements of one element shall take place, swinging about the other element as a center.

7. A car with a truck at each end pivoted so as to turn with reference to the direction of the car-body, in combination with an elastic supporting medium between the car and the axles of the trucks, and mechanism organized to sustain the driving-connection between the axles of the two trucks, consisting of a rotating shaft wherein are two or more universal joints and one or more slip-joints.

8. The combination of two trucks, an elastically-supported frame connecting the two trucks, and a motive power mounted midway between the two trucks upon the frame, a power-connection from the motor to the trucks, consisting of a longitudinally-rotating shaft connecting at a point upon the nearest axle of each truck, which point is located midway between the wheels, pivots between the ends of the car and the trucks, whereby they are independent and free to turn in making curves in the track, and additional supports between the truck and the frame at a distance laterally from said pivot, by means of which the torque of the motor upon the shaft is opposed and overcome.

9. A car mounted upon pivoted trucks located near each end, a motor supported by the car and sustaining power-connections to one of the axles of each truck, and independent power-connections between the axles of each truck, in combination with elastic supports between each axle and the truck or car, so that each axle has independently freedom of movement upward and downward, the movement of each element turning about the other as a center in such a way as to not interfere with the operation of the power-connection.

10. A car mounted upon pivoted trucks located near each end, a motor supported by the car and sustaining power-connections to one of the axles of each truck, and independent power-connections between the axles of each truck, in combination with elastic supports between each end of each axle and the truck or car, so that each end of each axle has independently freedom of movement without interfering with the power-connection.

11. A car mounted upon pivoted trucks located near each end of the car, a motor supported by the car and sustaining power-connections to one of the axles of each truck, in combination with elastic supports between each axle and the truck or car, so that each axle has independently freedom of vertical movement, and also is free to move laterally through a short distance independent of the other axle or axles of the same truck.

12. In a motor-car, the combination, with the axles, of gear-wheels mounted thereon, a frame also mounted thereon containing a co-operative gear-wheel, said frame depending for its support as to alignment entirely upon its support upon said axle, and power-connections connecting the frame-supported gear-wheel with the motor, substantially as and for the purpose specified.

13. In a motor-car, the combination, with the axles, of a gear-wheel mounted upon each axle, a frame also mounted upon the axle containing a co-operating gear-wheel, said frame depending for its support as to alignment entirely upon the journals upon said axle, and an arm connected with said frame, which reaches to another axle, and a universal joint near the other axle, and power-connections from the gear-wheel within the frame to the motor, substantially as specified.

14. In a motor-car, a slip-joint consisting of a frame-work containing rollers which are separated by a rectangular space, and a plate the section of which conforms with the slot left between the rollers, substantially as and for the purpose specified.

In witness whereof I have hereunto set my hand this 13th day of March, 1890.

ELMER A. SPERRY.

In presence of—
CELESTE P. CHAPMAN,
DAVIDA J. JOHNSON.